United States Patent [19]
Bain

[11] 3,768,766
[45] Oct. 30, 1973

[54] TABLE LEVELLING DEVICE
[76] Inventor: Alexander O. Bain, Hamilton, Ontario, Canada
[22] Filed: Oct. 21, 1970
[21] Appl. No.: 82,691

[52] U.S. Cl............................ 248/188.2, 248/188.7
[51] Int. Cl.......................................... F16m 11/24
[58] Field of Search................ 248/20, 188.2, 188.3; 182/202; 92/34, 42, 43, 44

[56] References Cited
UNITED STATES PATENTS
1,344,037   6/1920   Heymann............................ 92/44 X
2,552,941   5/1951   Courtney............................ 182/202
2,598,875   6/1952   Anderson......................... 182/202 X FOREIGN PATENTS OR APPLICATIONS
834,501   3/1952   Germany............................ 182/202

Primary Examiner—William H. Schultz
Attorney—Westell & Hanley

[57] ABSTRACT

Articles are provided with hydraulic lines to supports where the supported length is proportional to the hydraulic liquid in the line. Control means may be set to interconnect all the lines or to disconnect the lines from each other.

2 Claims, 5 Drawing Figures

INVENTOR
ALEXANDER O. BAIN
BY
*Westell & Hanley*

INVENTOR
ALEXANDER O. BAIN
BY
*Westell & Hanley*

TABLE LEVELLING DEVICE

This invention relates to a system for the support of articles supported or supportable on a plurality of spaced supports (such articles including but not being limited to furniture, appliances, industrial and laboratory equipment) to allow the adjustment of its attitude and to prevent the type of vibration which takes place when the lower ends of the supports on furniture or the like will not simultaneously contact the surface on which the furniture is supported (through such supports). It is noted that the lastmentioned type of vibration may occur on a flat surface with supports of uneven length or with supports of even lengths on a surface of uneven contour. The invention is equally applicable to the prevention of vibration in either alternative situation and the invention is applicable to the adjustment of attitude of a piece of furniture.

The invention will be described principally in relation to a piece of furniture having four supports. However, after consideration of the description of the invention, it will be obvious that the invention is equally applicable to furniture having three or five or more supports.

The invention provides, for example, an article of furniture, such as a table, having four supports which are designed and constructed to extend between the article and a supporting surface on which it is intended that the article shall rest. Each support is made longitudinally contractable and extendable, and has, associated therewith, an hydraulic chamber whose volume enlarges and contracts as the length of the support increases and decreases, so that the supply of hydraulic fluid to the chamber tends to enlarge it and extend the support, and the weight of the table borne by the support tends to contract the support, contract the chamber and drive liquid out of the latter. Conduits extend from each of the chambers and are connected thereto to convey liquid to and from the chambers. The conduits are also connectible to a control or valving means which is designed either to connect them to each other or to disconnect them from each other. Liquid is used to fill the chambers, conduits and relevant portions of the control or valving means.

A table fitted with supports in accord with the invention may be placed on the surface which is intended to support it, with the control or valving means set so that the conduits are interconnected. With the weight of the table borne by the supports, the table will automatically come to rest with all supports contacting the surface on which the table rests, since each support contacting the surface will tend to contract under the weight it bears, tending to force liquid out of its associated chamber, so that hydraulic pressure equalizes through the control means, with all supports contacting the support surface. If the control means is turned to disconnect the conduits at this point, the table will remain firmly seated on the support surface with all supports in contact with the surface. It will be noted, in addition, that at the time the control or valving means is set to interconnect the conduits, the table may be levelled to the extent allowed by the range of movement of the supports, in addition to having all the supports in contact. With the levelling thus achieved to the degree permitted, the control or valving means may be turned to the disconnect position. The table will be retained in its attitude while in the disconnect position since the amount of liquid in the conduit and chamber for each support is fixed during disconnection of the conduits.

The table has been used as an example. However, it will be realized that the invention applies with equal utility and novelty to other articles of furniture including: stands, desks, appliances (Such as washers and refrigerators) industrial machinery, and any article ordinarily mounted on a floor or other base surface by legs, leg-like or spaced supports. The term 'leg supported article' is intended to include all such devices.

The invention will be seen to be of particular advantage with such articles as: refrigerators, washers or dryers, or other articles, which may have to be set in locations where only one or two outside legs or supports are exposed. To level or prevent vibration of such an article by conventional means, with shims or the like, is a difficult and frustrating operation. However, a refrigerator or other article incorporating the invention, may be provided with a control knob for the control or valving means with the control means located to be accessible in the final position of the article. With the refrigerator in a location where all sides but the side exposing the control or valving location are inaccessible, the control or valve is turned to interconnect the conduits so that all supports contact the floor. While maintaining such contact, the refrigerator may be levelled to the extent allowed. If the control is now turned to disconnect the conduits, the refrigerator will now maintain its attitude.

With the refrigerator, as with other articles, it will be noted that the invention allows all supports to be caused to bear on the floor or base surface independently of whether or not the base or floor is planar. In other words, within the range of the support movements, the system in accord with the invention allows the support for the article to adapt to a surface of any contour, within the limits of expansion or contraction of the article.

The system has been described in relation to a four legged article. However it will be realized that the invention is of value with articles having three or more supports or legs.

The system has been described in relation to an article where four or more legs or supports are all retractible and extendible. However, it will be realized that some, although not all of the advantages of the invention, accrue from the provision of furniture with some legs or supports retractable and extendible and others fixed. Thus it will be noted that an article with only two or three legs or supports connected in accord with the invention, may be adjusted so that all four legs or supports contact a flat surface, and some irregularly contoured surfaces. A similar statement may be made about an article with three legs or supports having two connected in accord with the invention.

Such arrangements are not, however, as advantageous as the arrangement which provides all legs connected in accord with the invention. Thus although the device may be adjusted to have all legs in contact with the floor, the weight may be unevenly distributed as compared to a device with all hydraulically connected legs, and moreover the device may be 'level' only to a much more limited degree.

In drawings which illustrate a preferred embodiment of the invention:

Figure 1:
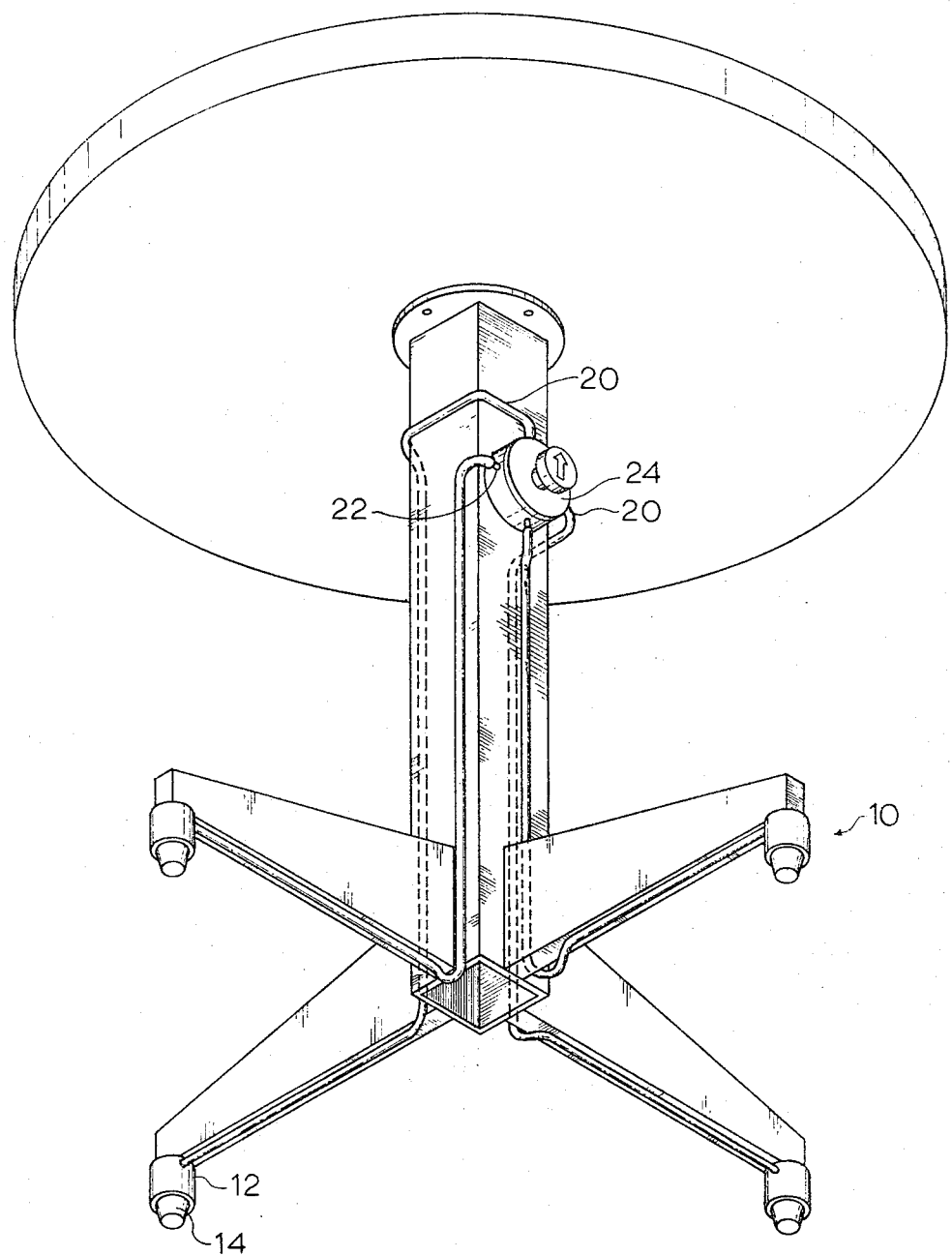
FIG. 1 shows a perspective of the device in accord with the invention.
Figure 2:
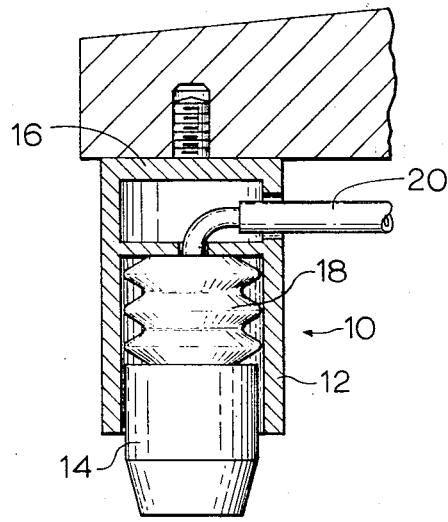
FIG. 2 shows a support in accord with the invention.
Figure 3:
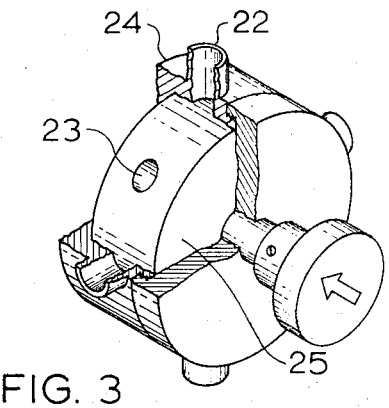
FIG. 3 shows a control means partially broken away.
Figure 4:
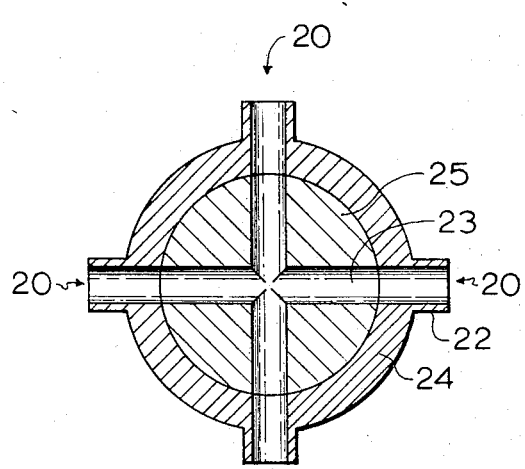
FIGS. 4 and 5 are schematics showing the operation of the control means.
Figure 5:
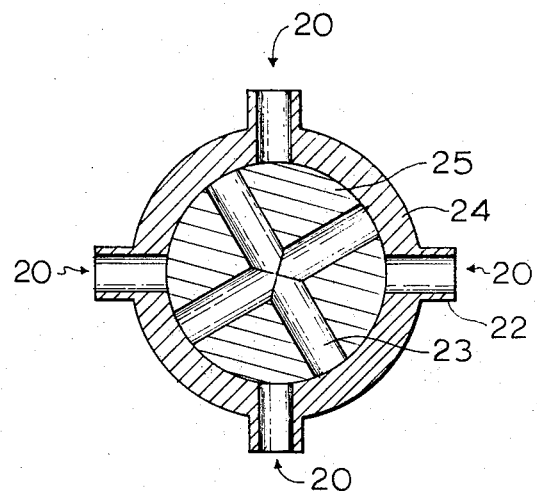

In FIG. 1 is shown a table having four supports or legs 10, each of which is constructed in accord with FIG. 2. As shown the leg of FIG. 2 the support comprises a downwardly extending tube or sleeve 12 having a member 14 for contacting the floor supporting surface slidable therein. The member 14 is spaced from a plate 16 rigidly mounted in the tube 12 by a bellows 18 designed to receive liquid and to expand in volume in response to the flow of liquid thereto and to contract in volume in response to the flow of liquid therefrom. (It will be noted that due to the design of the bellows, the expansion and contraction are directly related to the lengthening and shortening of the bellows to produce upward and downward sliding of the member 14 relative to the plate 16). The bellows 18 is connected for the conduction of liquid to a conduit 20. Thus it will be seen that, in each support 10 with the weight of the table bearing downwardly thereon, that the support 10 will reach a position determined by the amount fo liquid maintained in the bellows chamber under the pressure of the member 14 upwardly thereon. Thus an increase in the supply of liquid tends to enlarge the bellows 18 and extend the support 10 while the reaction pressure of the base surface on the member 14 tends to contract the bellows 18. As shown in FIG. 1, the conduits 20 are connected to a common control means being a valve having four ports 22 in a stationary member 24 one port corresponding to each of the conduits 20 and an internal rotary member 25 having four correspondingly radially directed and connected ports 23 turnable by the member and designed to assume two positions, the first of which is shown in FIG. 4 interconnecting the four conduits 20 and the second position of which is shown in FIG. 5 where the conduits are disconnected. It will be noted that these positions may be indicated to the user by indicia (not shown) on the stator or rotor, of the valve. The bellows 18, conduit 20 and valve means are filled with a liquid.

In accord with the invention, the table is adjusted to suit the contour of the floor surface on which it rests by turning the control means to the position of FIG. 4, where all the conduits 20 are interconnected. As soon as this is done the repsective bellows 18 will all contract or expand to the extent necessary to move the liquid sufficiently to provide through the interconnected hyraulic system (comprising the bellows, the conduits and the interconnecting valve) that all supports are in contact with the floor. In addition, if desired, the attitude of the table may be varied leaving the supports in contact with the surface, within the scope of movements of the retractable extendable supports. When the desired attitude of the table has been achieved the control means may be turned to the position of FIG. 5 so that all the conduits disconnected and the table will retain the attitude in which it is set since flow of liquid into and out of each chamber is prevented.

It will be obvious that the operation of the invention is independent of the number of supports or legs when all are connected and as to the operation when fewer than all are connected, reference is made to the preceding paragraph.

It will also be obvious that the invention is independent of the length of the supports or legs and although short legs are shown it will be obvious that longer legs or supports would work equally well in accord with the invention.

It will further be obvious that the invention is independent of the type of hydraulic chamber used and that, for example, a piston and cylinder could be used in substitution for the bellows, the only restriction on the design of the hydraulic chamber is that the volume must be that the length in the retraction and extension direction of the support must be determined by the volume of liquid in the hydraulic chamber so that an increase in the amount of liquid in the chamber will extend the support and contraction of the support will move liquid out of the chamber.

It will further be obvious that the type of control means for connecting and disconnecting the ports will not matter as long as the control méans has two states, one state when all the conduits are connected in a single hydraulic system and the other state where they are disconnected into separate hydraulic systems.

I claim:

1. Means for ensuring static support on a base surface of an article of the class comprising furniture, appliances, industrial and laboratory equipment and which article is of the type which has four or more spaced individual supports attached to the article and arranged to extend downwardly therefrom to contact the base surface and support the article thereabove;

at least all but one of said supports being longitudinally extendable and contractable in the downward extension direction to allow variation in the length thereof and constructed so that the length is increased by the supply of liquid thereto and so that the decrease in length of said support causes the expulsion of liquid therefrom, a conduit corresponding to each of said contractable and extendable supports mounted on said article for conducting liquid between a control means and an expansible chamber in the corresponding support, each of said conduits being connected to the expansible chamber of the corresponding support to allow the supply of liquid to said support and to receive the liquid expelled therefrom, said control means being arranged and constructed in one setting, to interconnect said conduits and in another setting, to disconnect said conduits from each other, hydraulic liquid contained in said conduits and said control means whereby the contraction of one or more of said supports causes the extension of others of said supports, when said conduits are interconnected.

2. Means as claimed in claim 1 wherein each of said supports is longitudinally contractable and extendable.

* * * * *